(12) United States Patent
Berkcan et al.

(10) Patent No.: US 7,068,612 B2
(45) Date of Patent: Jun. 27, 2006

(54) METHOD FOR COMMUNICATING INFORMATION BUNDLED IN DIGITAL MESSAGE PACKETS

(75) Inventors: Ertugrul Berkcan, Clifton Park, NY (US); Daniel White Sexton, Niskayuna, NY (US); Scott Charles Evans, Burnt Hills, NY (US); Marc Robert Pearlman, Clifton Park, NY (US); Emad Andarawis Andarawis, Ballston lake, NY (US); William James Premerlani, Scotia, NY (US)

(73) Assignee: General Electric Company, Schenectady, NY (US)

( * ) Notice: Subject to any disclaimer, the term of this patent is extended or adjusted under 35 U.S.C. 154(b) by 463 days.

(21) Appl. No.: 10/373,575

(22) Filed: Feb. 25, 2003

(65) Prior Publication Data
US 2003/0214907 A1    Nov. 20, 2003

Related U.S. Application Data

(60) Provisional application No. 60/359,544, filed on Feb. 25, 2002, provisional application No. 60/438,159, filed on Jan. 6, 2003.

(51) Int. Cl.
*H04L 12/26* (2006.01)
(52) U.S. Cl. .................. 370/252; 370/253; 370/352
(58) Field of Classification Search ............. 370/252, 370/253, 352
See application file for complete search history.

(56) References Cited

U.S. PATENT DOCUMENTS

| | | | |
|---|---|---|---|
| 3,772,505 A | 11/1973 | Massell | |
| 3,938,007 A | 2/1976 | Boniger et al. | |
| 3,956,671 A | 5/1976 | Nimmersjo | |
| 3,963,964 A | 6/1976 | Mustaphi | |
| 4,001,742 A | 1/1977 | Jencks et al. | |
| 4,245,318 A | 1/1981 | Eckart et al. | |
| 4,291,299 A | 9/1981 | Hinz et al. | |
| 4,301,433 A | 11/1981 | Castonguay et al. | |
| 4,311,919 A | 1/1982 | Nail | |
| 4,415,968 A | 11/1983 | Maeda et al. | |
| 4,423,459 A | 12/1983 | Stich et al. | |
| 4,432,031 A | 2/1984 | Premerlani | |
| 4,455,612 A | 6/1984 | Girgis et al. | |
| 4,468,714 A | 8/1984 | Russell | |
| 4,589,074 A | 5/1986 | Thomas et al. | |
| 4,623,949 A | 11/1986 | Salowe et al. | |
| 4,631,625 A | 12/1986 | Alexander et al. | |
| 4,642,724 A | 2/1987 | Ruta | |
| 4,652,966 A | 3/1987 | Farag et al. | |

(Continued)

FOREIGN PATENT DOCUMENTS

EP        0718948 A2     6/1996

(Continued)

*Primary Examiner*—Dang Ton
*Assistant Examiner*—Jay P. Patel
(74) *Attorney, Agent, or Firm*—Ohlandt, Greeley, Ruggiero & Perle, L.L.P.

(57) ABSTRACT

A method for communicating information bundled in digital message packets via a digital network communication system is provided. The digital network communication system a sample source and each packet includes a header and a communication payload area. The method includes sampling the source at a first sample rate, selecting at least one decimation of the samples based on at least one of a plurality of algorithmic data rates and a channel bandwidth, determining a packet rate based on a plurality of algorithmic latency requirements, and transmitting the digital message packet containing decimated data on the digital network.

22 Claims, 7 Drawing Sheets

U.S. PATENT DOCUMENTS

| | | |
|---|---|---|
| 4,672,501 A | 6/1987 | Bilac et al. |
| 4,672,555 A | 6/1987 | Hart et al. |
| 4,674,062 A | 6/1987 | Premerlani |
| 4,689,712 A | 8/1987 | Demeyer |
| 4,709,339 A | 11/1987 | Fernandes |
| 4,751,653 A | 6/1988 | Junk et al. |
| 4,752,853 A | 6/1988 | Matsko et al. |
| 4,754,407 A | 6/1988 | Nolan |
| 4,777,607 A | 10/1988 | Maury et al. |
| 4,783,748 A | 11/1988 | Swarztrauber et al. |
| 4,796,027 A | 1/1989 | Smith-Vaniz |
| 4,833,592 A | 5/1989 | Yamanaka |
| 4,849,848 A | 7/1989 | Ishii |
| 4,855,671 A | 8/1989 | Fernandes |
| 4,862,308 A | 8/1989 | Udren |
| 4,964,058 A | 10/1990 | Brown, Jr. |
| 4,979,122 A | 12/1990 | Davis et al. |
| 4,983,955 A | 1/1991 | Ham, Jr. et al. |
| 4,996,646 A | 2/1991 | Farrington |
| 5,053,735 A | 10/1991 | Ohishi et al. |
| 5,060,166 A | 10/1991 | Engel et al. |
| 5,101,191 A | 3/1992 | MacFadyen et al. |
| 5,134,691 A | 7/1992 | Elms |
| 5,136,458 A | 8/1992 | Durivage, III |
| 5,162,664 A | 11/1992 | Haun et al. |
| 5,166,887 A | 11/1992 | Farrington et al. |
| 5,170,310 A | 12/1992 | Studtmann et al. |
| 5,170,360 A | 12/1992 | Porter et al. |
| 5,179,376 A | 1/1993 | Pomatto |
| 5,182,547 A | 1/1993 | Griffith |
| 5,185,705 A | 2/1993 | Farrington |
| 5,196,831 A | 3/1993 | Bscheider |
| 5,214,560 A | 5/1993 | Jensen |
| 5,216,621 A | 6/1993 | Dickens |
| 5,225,994 A | 7/1993 | Arinobu et al. |
| 5,231,565 A | 7/1993 | Bilas et al. |
| 5,237,511 A | 8/1993 | Caird et al. |
| 5,247,454 A | 9/1993 | Farrington et al. |
| 5,253,159 A | 10/1993 | Bilas et al. |
| 5,272,438 A | 12/1993 | Stumme |
| 5,301,121 A | 4/1994 | Garverick et al. |
| 5,305,174 A | 4/1994 | Morita et al. |
| 5,311,392 A | 5/1994 | Kinney et al. |
| 5,323,307 A | 6/1994 | Wolf et al. |
| 5,353,188 A | 10/1994 | Hatakeyama |
| 5,361,184 A | 11/1994 | El-Sharkawi et al. |
| 5,367,427 A | 11/1994 | Matsko et al. |
| 5,369,356 A | 11/1994 | Kinney et al. |
| 5,381,554 A | 1/1995 | Langer et al. |
| 5,384,712 A | 1/1995 | Oravetz et al. |
| 5,402,299 A | 3/1995 | Bellei |
| 5,406,495 A | 4/1995 | Hill |
| 5,414,635 A | 5/1995 | Ohta |
| 5,420,799 A | 5/1995 | Peterson et al. |
| 5,422,778 A | 6/1995 | Good et al. |
| 5,440,441 A | 8/1995 | Ahuja |
| 5,451,879 A | 9/1995 | Moore |
| 5,487,016 A | 1/1996 | Elms |
| 5,490,086 A | 2/1996 | Leone et al. |
| 5,493,468 A | 2/1996 | Hunter et al. |
| 5,530,738 A | 6/1996 | McEachern |
| 5,534,782 A | 7/1996 | Nourse |
| 5,534,833 A | 7/1996 | Castonguay et al. |
| 5,537,327 A | 7/1996 | Snow et al. |
| 5,544,065 A | 8/1996 | Engel et al. |
| 5,559,719 A | 9/1996 | Johnson et al. |
| 5,560,022 A | 9/1996 | Dunstan et al. |
| 5,576,625 A | 11/1996 | Sukegawa et al. |
| 5,581,471 A | 12/1996 | McEachern et al. |
| 5,587,917 A | 12/1996 | Elms |
| 5,596,473 A | 1/1997 | Johnson et al. |
| 5,600,527 A | 2/1997 | Engel et al. |
| 5,608,646 A | 3/1997 | Pomatto |
| 5,613,798 A | 3/1997 | Braverman |
| 5,619,392 A | 4/1997 | Bertsch et al. |
| 5,627,716 A | 5/1997 | Lagree et al. |
| 5,627,717 A | 5/1997 | Pein et al. |
| 5,627,718 A | 5/1997 | Engel et al. |
| 5,629,825 A | 5/1997 | Wallis et al. |
| 5,631,798 A | 5/1997 | Seymour et al. |
| 5,638,296 A | 6/1997 | Johnson et al. |
| 5,650,936 A | 7/1997 | Loucks et al. |
| 5,661,658 A | 8/1997 | Putt et al. |
| 5,666,256 A | 9/1997 | Zavis et al. |
| 5,670,923 A | 9/1997 | Gonzalez et al. |
| 5,694,329 A | 12/1997 | Pomatto |
| 5,696,695 A | 12/1997 | Ehlers et al. |
| 5,719,738 A | 2/1998 | Singer et al. |
| 5,734,576 A | 3/1998 | Klancher |
| 5,736,847 A | 4/1998 | Van Doorn et al. |
| 5,737,231 A | 4/1998 | Pyle et al. |
| 5,742,513 A | 4/1998 | Bouhenguel et al. |
| 5,751,524 A | 5/1998 | Swindler |
| 5,754,033 A | 5/1998 | Thomson |
| 5,754,440 A | 5/1998 | Cox et al. |
| 5,768,148 A | 6/1998 | Murphy et al. |
| 5,784,237 A | 7/1998 | Velez |
| 5,784,243 A | 7/1998 | Pollman et al. |
| 5,786,699 A | 7/1998 | Sukegawa et al. |
| 5,812,389 A | 9/1998 | Katayama et al. |
| 5,821,704 A | 10/1998 | Carson et al. |
| 5,825,643 A | 10/1998 | Dvorak et al. |
| 5,828,576 A | 10/1998 | Loucks et al. |
| 5,828,983 A | 10/1998 | Lombardi |
| 5,831,428 A | 11/1998 | Pyle et al. |
| 5,867,385 A | 2/1999 | Brown et al. |
| 5,872,722 A | 2/1999 | Oravetz et al. |
| 5,872,785 A | 2/1999 | Kienberger |
| 5,890,097 A | 3/1999 | Cox |
| 5,892,449 A | 4/1999 | Reid et al. |
| 5,903,426 A | 5/1999 | Ehling |
| 5,905,616 A | 5/1999 | Lyke |
| 5,906,271 A | 5/1999 | Castonguay et al. |
| 5,926,089 A | 7/1999 | Sekiguchi et al. |
| 5,936,817 A | 8/1999 | Matsko et al. |
| 5,946,210 A | 8/1999 | Montminy et al. |
| 5,958,060 A | 9/1999 | Premerlani |
| 5,963,457 A | 10/1999 | Kanoi et al. |
| 5,973,481 A | 10/1999 | Thompson et al. |
| 5,973,899 A | 10/1999 | Williams et al. |
| 5,982,595 A | 11/1999 | Pozzuoli |
| 5,982,596 A | 11/1999 | Spencer et al. |
| 5,995,911 A | 11/1999 | Hart |
| 6,005,757 A | 12/1999 | Shvach et al. |
| 6,005,758 A | 12/1999 | Spencer et al. |
| 6,018,451 A | 1/2000 | Lyke et al. |
| 6,038,516 A | 3/2000 | Alexander et al. |
| 6,047,321 A | 4/2000 | Raab et al. |
| 6,054,661 A | 4/2000 | Castonguay et al. |
| 6,055,145 A | 4/2000 | Lagree et al. |
| 6,061,609 A | 5/2000 | Kanoi et al. |
| 6,084,758 A | 7/2000 | Clarey et al. |
| 6,138,241 A | 10/2000 | Eckel et al. |
| 6,139,327 A | 10/2000 | Callahan et al. |
| 6,141,196 A | 10/2000 | Premerlani et al. |
| 6,157,527 A | 12/2000 | Spencer et al. |
| 6,167,329 A | 12/2000 | Engel et al. |
| 6,175,780 B1 | 1/2001 | Engel |
| 6,185,482 B1 | 2/2001 | Egolf et al. |
| 6,185,508 B1 | 2/2001 | Van Doorn et al. |
| 6,186,842 B1 | 2/2001 | Hirschbold et al. |
| 6,195,243 B1 | 2/2001 | Spencer et al. |
| 6,198,402 B1 | 3/2001 | Hasegawa et al. |
| 6,212,049 B1 | 4/2001 | Spencer et al. |

| | | |
|---|---|---|
| 6,233,128 B1 | 5/2001 | Spencer et al. |
| 6,236,949 B1 | 5/2001 | Hart |
| 6,242,703 B1 | 6/2001 | Castonguay et al. |
| 6,268,991 B1 | 7/2001 | Criniti et al. |
| 6,285,917 B1 | 9/2001 | Sekiguchi et al. |
| 6,288,882 B1 | 9/2001 | DiSalvo et al. |
| 6,289,267 B1 | 9/2001 | Alexander et al. |
| 6,291,911 B1 | 9/2001 | Dunk et al. |
| 6,292,340 B1 | 9/2001 | O'Regan et al. |
| 6,292,717 B1 | 9/2001 | Alexander et al. |
| 6,292,901 B1 | 9/2001 | Lys et al. |
| 6,297,939 B1 | 10/2001 | Bilac et al. |
| 6,313,975 B1 | 11/2001 | Dunne et al. |
| 6,341,054 B1 | 1/2002 | Walder et al. |
| 6,347,027 B1 | 2/2002 | Nelson et al. |
| 6,351,823 B1 | 2/2002 | Mayer et al. |
| 6,356,422 B1 | 3/2002 | Bilac et al. |
| 6,356,849 B1 | 3/2002 | Jaffe |
| 6,369,996 B1 | 4/2002 | Bo |
| 6,373,855 B1 * | 4/2002 | Downing et al. ............ 370/468 |
| 6,377,051 B1 | 4/2002 | Tyner et al. |
| 6,385,022 B1 | 5/2002 | Kulidjian et al. |
| 6,396,279 B1 | 5/2002 | Gruenert |
| 6,397,155 B1 | 5/2002 | Przydatek et al. |
| 6,405,104 B1 | 6/2002 | Dougherty |
| 6,406,328 B1 | 6/2002 | Attarian et al. |
| 6,411,865 B1 | 6/2002 | Qin et al. |
| 6,441,931 B1 | 8/2002 | Moskovich et al. |
| 6,459,997 B1 | 10/2002 | Andersen |
| 6,496,342 B1 | 12/2002 | Horvath et al. |
| 6,535,797 B1 | 3/2003 | Bowles et al. |
| 6,549,880 B1 | 4/2003 | Willoughby et al. |
| 6,553,418 B1 | 4/2003 | Collins et al. |
| 6,556,560 B1 * | 4/2003 | Katseff et al. ............... 370/352 |
| 2001/0010032 A1 | 7/2001 | Ehlers et al. |
| 2001/0032025 A1 | 10/2001 | Lenz et al. |
| 2001/0044588 A1 | 11/2001 | Mault |
| 2001/0048354 A1 | 12/2001 | Douville et al. |
| 2001/0055276 A1 * | 12/2001 | Rogers et al. ............... 370/232 |
| 2001/0055965 A1 | 12/2001 | Delp et al. |
| 2002/0010518 A1 | 1/2002 | Reid et al. |
| 2002/0032535 A1 | 3/2002 | Alexander et al. |
| 2002/0034086 A1 | 3/2002 | Scoggins et al. |
| 2002/0045992 A1 | 4/2002 | Shincovich et al. |
| 2002/0059401 A1 | 5/2002 | Austin |
| 2002/0063635 A1 | 5/2002 | Shincovich |
| 2002/0064010 A1 | 5/2002 | Nelson et al. |
| 2002/0091949 A1 | 7/2002 | Ykema |
| 2002/0094799 A1 | 7/2002 | Elliott et al. |
| 2002/0107615 A1 | 8/2002 | Bjorklund |
| 2002/0108065 A1 | 8/2002 | Mares |
| 2002/0109722 A1 | 8/2002 | Rogers et al. |
| 2002/0111980 A1 | 8/2002 | Miller et al. |
| 2002/0114285 A1 * | 8/2002 | LeBlanc ..................... 370/252 |
| 2002/0116092 A1 | 8/2002 | Hamamatsu et al. |
| 2002/0124011 A1 | 9/2002 | Baxter et al. |
| 2002/0146076 A1 | 10/2002 | Lee |
| 2002/0146083 A1 | 10/2002 | Lee et al. |
| 2002/0147503 A1 | 10/2002 | Osburn, III |
| 2002/0159402 A1 | 10/2002 | Binder |
| 2002/0162014 A1 | 10/2002 | Przydatek et al. |
| 2002/0163918 A1 | 11/2002 | Cline |
| 2002/0165677 A1 | 11/2002 | Lightbody et al. |
| 2002/0181174 A1 | 12/2002 | Bilac et al. |
| 2002/0193888 A1 | 12/2002 | Wewalaarachchi et al. |
| 2003/0043785 A1 | 3/2003 | Liu et al. |
| 2004/0071132 A1 * | 4/2004 | Sundqvist et al. .......... 370/352 |
| 2004/0090994 A1 * | 5/2004 | Lockridge et al. .......... 370/509 |
| 2004/0213203 A1 * | 10/2004 | Lucioni ...................... 370/352 |
| 2004/0223510 A1 * | 11/2004 | Tzannes et al. ............. 370/464 |
| 2005/0152382 A1 * | 7/2005 | Stirling et al. .............. 370/403 |

FOREIGN PATENT DOCUMENTS

| | | |
|---|---|---|
| EP | 0723325 A1 | 7/1996 |
| WO | WO 02/052240 A1 * | 7/2002 |

* cited by examiner

METHOD FOR COMMUNICATING INFORMATION BUNDLED IN DIGITAL MESSAGE PACKETS

CROSS REFERENCE TO RELATED APPLICATIONS

This application is related to U.S. patent application Ser. No. 60/359,544 filed on Feb. 25, 2002 for "Integrated Protection, Monitoring, and Control" the content of which is incorporated in its entirety herein by reference. This application is also related to U.S. patent application Ser. No. 60/438,159 filed on Jan. 6, 2003 for "Single Processor Concept for Protection and Control of Circuit Breakers in Low-Voltage Switchgear" the content of which is incorporated in its entirety herein by reference.

BACKGROUND OF THE INVENTION

This invention relates generally to electrical switchgear and more particularly, to a method and apparatus for facilitating optimizing communications between power distribution system components.

In an industrial power distribution system, power generated by a power generation company may be supplied to an industrial or commercial facility wherein the power may be distributed throughout the industrial or commercial facility to various equipment such as, for example, motors, welding machinery, computers, heaters, lighting, and other electrical equipment. At least some known power distribution systems include switchgear which facilitates dividing the power into branch circuits which supply power to various portions of the industrial facility. Circuit breakers are provided in each branch circuit to facilitate protecting equipment within the branch circuit. Additionally, circuit breakers in each branch circuit can facilitate minimizing equipment failures since specific loads may be energized or de-energized without affecting other loads, thus creating increased efficiencies, and reduced operating and manufacturing costs. Similar switchgear may also be used within an electric utility transmission system and a plurality of distribution substations, although the switching operations used may be more complex.

Switchgear typically include multiple devices, other than the power distribution system components, to facilitate providing protection, monitoring, and control of the power distribution system components. For example, at least some known breakers include a plurality of shunt trip circuits, under-voltage relays, trip units, and a plurality of auxiliary switches that close the breaker in the event of an undesired interruption or fluctuation in the power supplied to the power distribution components. Additionally, at least one known power distribution system also includes a monitor device that monitors a performance of the power distribution system, a control device that controls an operation of the power distribution system, and a protection device that initiates a protective response when the protection device is activated.

In at least some other known power distribution systems, a monitor and control system operates independently of the protective system. For example, a protective device may de-energize a portion of the power distribution system based on its own predetermined operating limits, without the monitoring devices recording the event. The failure of the monitoring system to record the system shutdown may mislead an operator to believe that an over-current condition has not occurred within the power distribution system, and as such, a proper corrective action may not be initiated by the operator. Additionally, a protective device, i.e. a circuit breaker, may open because of an over-current condition in the power distribution system, but the control system may interpret the over-current condition as a loss of power from the power source, rather than a fault condition. As such, the control logic may undesirably attempt to connect the faulted circuit to an alternate source, thereby restoring the over-current condition. In addition to the potential increase in operational defects which may occur using such devices, the use of multiple devices and interconnecting wiring associated with the devices may cause an increase in equipment size, an increase in the complexity of wiring the devices, and/or an increase in a quantity of devices installed.

Centrally controlling of power distribution systems may overcome the above mentioned shortcomings of known power distribution systems. Central control systems may also present new problems which may need solutions before central control systems become a viable new control system. For example, communications between the central controller and controlled devices may occur over long distances, redundancy requirements may make communications slow due to additional devices communicating in parallel, and separate communication channels may need to be cross-checked for accuracy.

Central control systems may receive electrical inputs from the controlled process through remote input/output (I/O) modules communicating with the central control system over a high-speed communication network. Outputs generated by the industrial controller are likewise transmitted over the network to the I/O circuits to be communicated to the controlled equipment. The network provides a simplified means of communicating signals over an industrial environment without multiple point-to-point wires and the attendant cost of installation.

The central control system may use real time control to achieve latency goals. Effective real-time control is provided by executing the control program repeatedly in high speed "scan" cycles. During each scan cycle each remote node samples inputs at a selectable frequency and output messages are computed. The output messages are transmitted to the central control location where these data samples are processed to provide a control of the system such as centralized control. A relatively large number of samples are taken at the remote node, such as, for example 128 samples per second, and are packaged to share space in a message. Together with the high-speed communications network, this ensures the response of the central control system to changes in the inputs and its generation of outputs will be rapid. All information is dealt with centrally by a well-characterized processor and communicated over a high-speed communication network to yield predictable delay times, and low latency, which is critical to deterministic control. The high data transmission rate and large number of remote nodes attempting to communicate creates network traffic congestion that may adversely affect power distribution system latency and the ability of the power distribution system to operate efficiently.

BRIEF DESCRIPTION OF THE INVENTION

A method for communicating information bundled in digital message packets via a digital network communication system is provided. The digital network communication system a sample source and each packet includes a header and a communication payload area. The method includes sampling the source at a first sample rate, selecting at least one decimation of the samples based on at least one of a plurality of algorithmic data rates and a channel bandwidth, determining a packet rate based on a plurality of algorithmic latency requirements, and transmitting the digital message packet containing decimated data on the digital network.

DETAILED DESCRIPTION OF THE INVENTION

Figure 1:
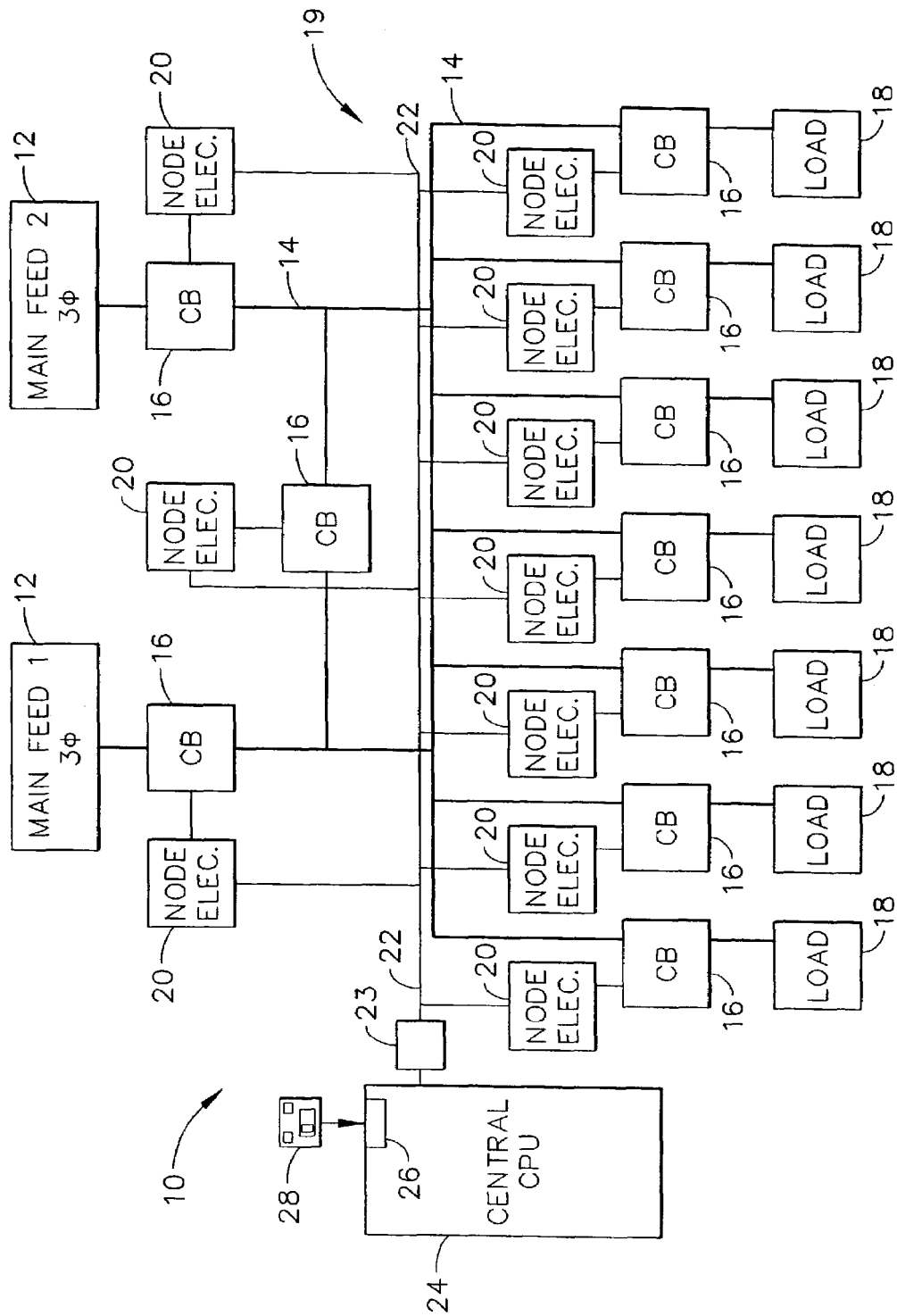
FIG. 1 is an exemplary schematic illustration of a power distribution system.

FIG. 1 illustrates an exemplary schematic illustration of a power distribution system 10, used by an industrial facility for example. In an exemplary embodiment, system 10 includes at least one main feed system 12, a power distribution bus 14, a plurality of power circuit switches or interrupters, also referred to herein as a circuit breakers (CB) 16, and at least one load 18, such as, but not limited to, motors, welding machinery, computers, heaters, lighting, and/or other electrical equipment.

In use, power is supplied to a main feed system 12, i.e. a switchboard for example, from a source (not shown) such as, but not limited to, a steam turbine, powered from, for example, a nuclear reactor or a coal fired boiler, a gas turbine generator, and a diesel generator. Power supplied to main feed system 12 is divided into a plurality of branch circuits using circuit breakers 16 which supply power to various loads 18 in the industrial facility. In addition, circuit breakers 16 are provided in each branch circuit to facilitate protecting equipment, i.e. loads 18, connected within the respective branch circuit. Additionally, circuit breakers 16 facilitate minimizing equipment failures since specific loads 18 may be energized or de-energized without affecting other loads 18, thus creating increased efficiencies, and reduced operating and manufacturing costs.

Power distribution system 10 includes a circuit breaker control protection system 19 that includes a plurality of node electronics units 20 that are each electrically coupled to a digital network 22. Circuit breaker control protection system 19 also includes at least one central control processing unit (CCPU) 24 that is electrically coupled to digital network 22 via a switch 23 such as, but not limited to, an Ethernet switch 23. In use, each respective node electronics unit 20 is electrically coupled to a respective circuit breaker 16, such that CCPU 24 is electrically coupled to each circuit breaker 16 through digital network 22 and through an associated node electronics unit 20.

In the exemplary embodiment, digital network 22 is a Fast Ethernet protocol network. In another embodiment, digital network 22 includes, for example, at least one of a local area network (LAN) or a wide area network (WAN), dial-in-connections, cable modems, and special high-speed ISDN lines. Digital network 22 also includes any device capable of interconnecting to the Internet including a web-based phone, personal digital assistant (PDA), or other web-based connectable equipment. It should be appreciated that the digital network 22 network is upgradeable based on future revisions to IEEE 802.3(u) and its successors. It should further be appreciated that the digital network 22 is configurable, for example, in a star topology.

In one embodiment, CCPU 24 is a computer and includes a device 26, for example, a floppy disk drive or CD-ROM drive, to facilitate reading instructions and/or data from a computer-readable medium 28, such as a floppy disk or CD-ROM. In another embodiment, CCPU 24 executes instructions stored in firmware (not shown). CCPU 24 is programmed to perform functions described herein, but other programmable circuits can likewise be programmed. Accordingly, as used herein, the term computer is not limited to just those integrated circuits referred to in the art as computers, but broadly refers to computers, processors, microcontrollers, microcomputers, programmable logic controllers, application specific integrated circuits, and other programmable circuits. Additionally, although described in a power distribution setting, it is contemplated that the benefits of the invention accrue to all electrical distribution systems including industrial systems such as, for example, but not limited to, an electrical distribution system installed in an office building.

Figure 2:
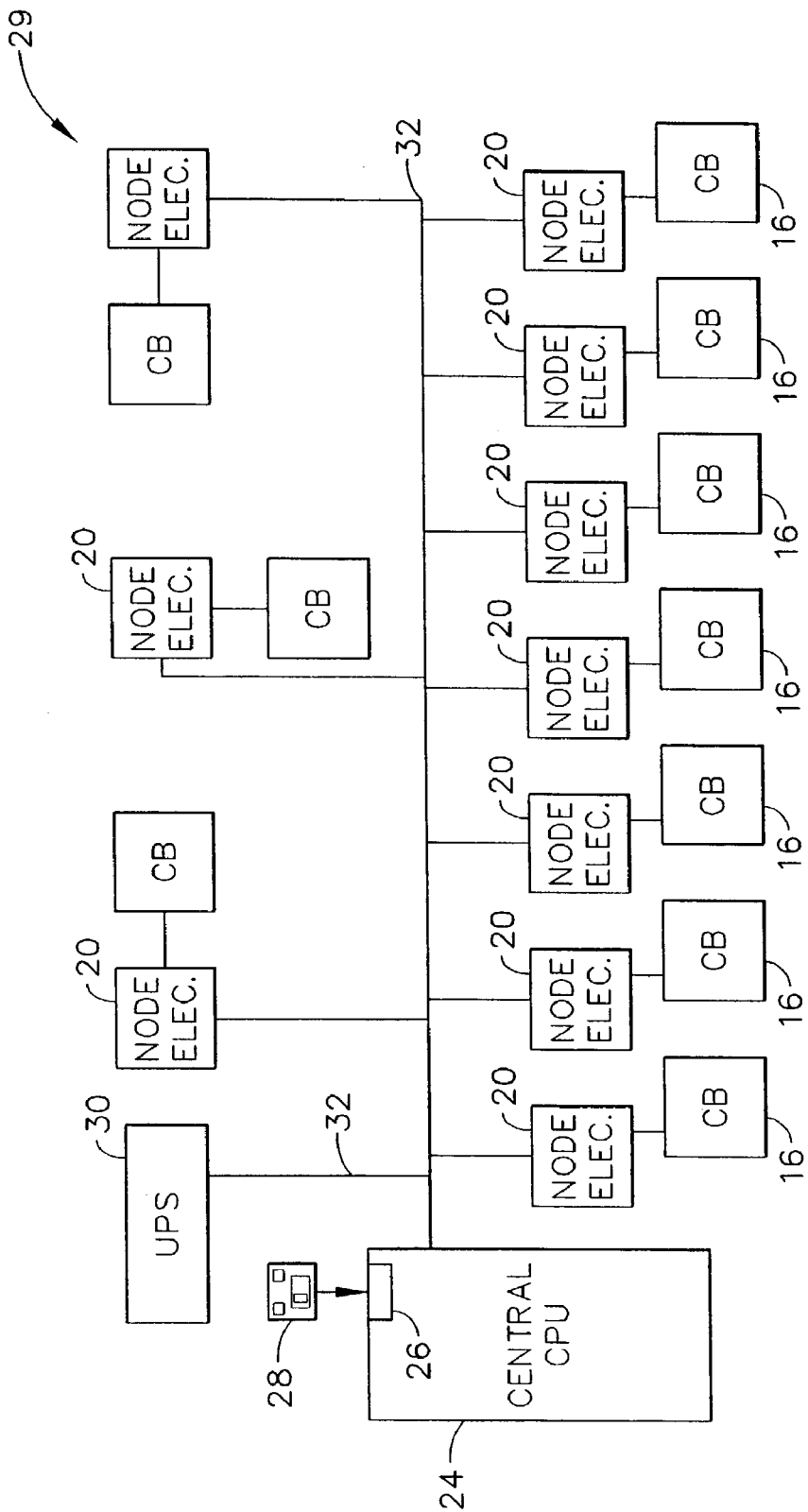
FIG. 2 is an exemplary schematic illustration of a node power system.

FIG. 2 is an exemplary schematic illustration of a node power distribution system 29 that can be used with power distribution system 10 (shown in FIG. 1) and more specifically, with circuit breaker control protection system 19 (shown in FIG. 1). Node power distribution system 29 includes a power source 30 that is electrically coupled to node electronics units 20 through a node power distribution bus 32. In an exemplary embodiment, power source 30 is an uninterruptible power supply (UPS). In one embodiment, power source 30 receives power from power distribution system 10 and then distributes this power to node electronics units 20 through node power distribution bus 32. In an alternative embodiment, power is not supplied to power source 30, but rather, power source 30 supplies power to node electronics units 20 using an internal power supply, such as, but not limited to, a plurality of batteries (not shown). In another alternate embodiment, node electronic units 20 are powered by secondary current available from current sensor 82 and/or voltage sensor 84. In this embodiment, circuit breaker control protection system 19 would not include node power distribution system 29, power source 30, or node power distribution bus 32.

Figure 3:
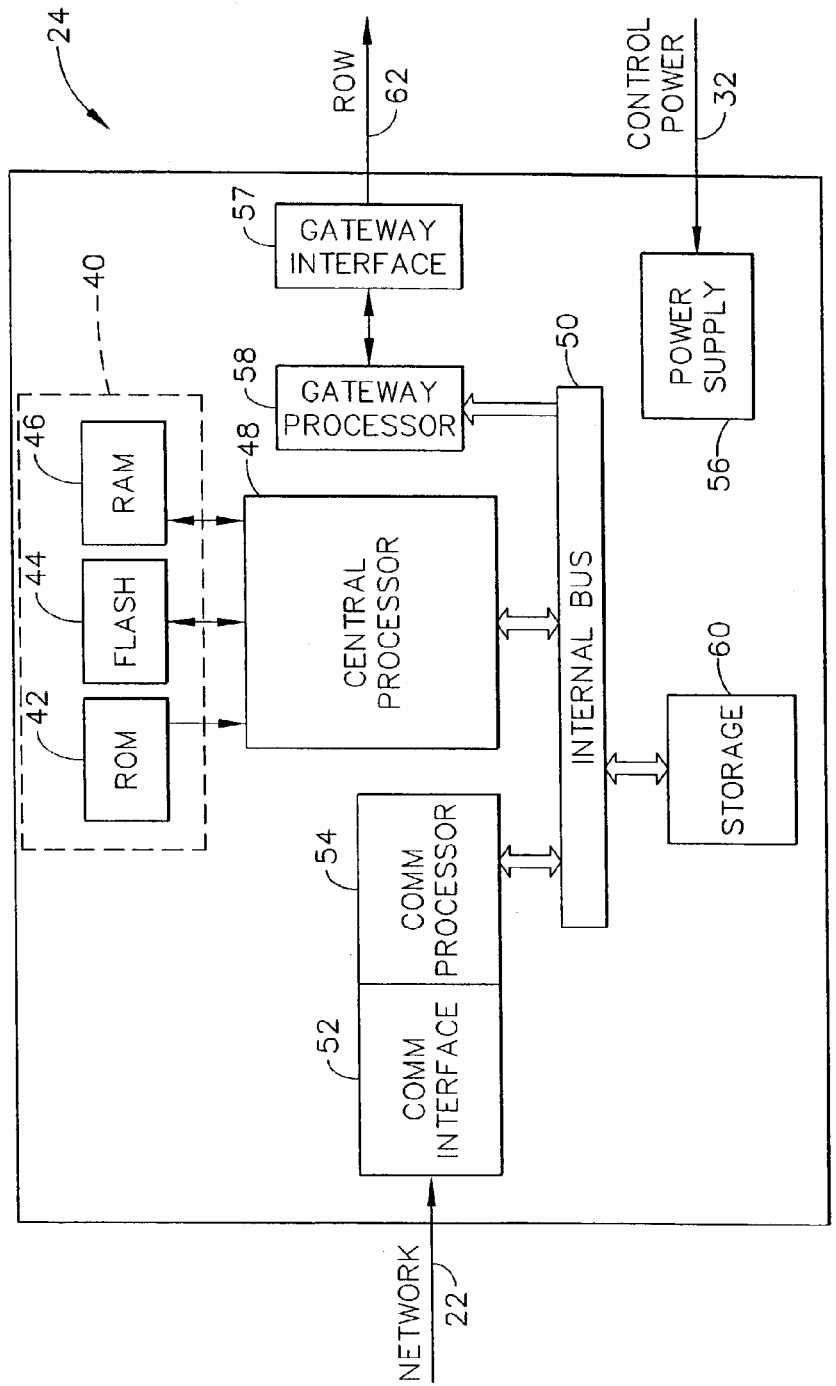
FIG. 3 is an exemplary schematic illustration of a central control processing unit that may used with the power distribution system shown in FIG. 1.

FIG. 3 is an exemplary schematic illustration of CCPU 24. CCPU 24 includes at least one memory device 40, such as, but not limited to, a read only memory (ROM) 42, a flash memory 44, and/or a random access memory (RAM) 46. CCPU 24 also includes a central processor unit (CPU) 48 that is electrically coupled to at least one memory device 40, as well as an internal bus 50, a communications interface 52, and a communications processor 54. In an exemplary embodiment, CCPU 24 is a printed circuit board and includes a power supply 56 to supply power to a plurality of devices on the printed circuit board.

Additionally, in an exemplary embodiment, internal bus 50 includes an address bus, a data bus, and a control bus. In use, the address bus is configured to enable CPU 48 to address a plurality of internal memory locations or an input/output port, such as, but not limited to communications interface 52 through communications processor 54, and a gateway interface 57, through a gateway processor 58. The data bus is configured to transmit instructions and/or data between CPU 48 and at least one input/output, and the control bus is configured to transmit signals between the plurality of devices to facilitate ensuring that the devices are operating in synchronization. In the exemplary embodiment, internal bus 50 is a bi-directional bus such that signals can be transmitted in either direction on internal bus 50. CCPU 24 also includes at least one storage device 60 configured to store a plurality of information transmitted via internal bus 50.

In use, gateway interface 57 communicates to a remote workstation (not shown) via an Internet link 62 or an Intranet 62. In the exemplary embodiment, the remote workstation is a personal computer including a web browser. Although a single workstation is described, such functions as described herein can be performed at one of many personal computers coupled to gateway interface 57. For example, gateway interface 57 may be communicatively coupled to various individuals, including local operators and to third parties, e.g., remote system operators via an ISP Internet connection. The communication in the example embodiment is illustrated as being performed via the Internet, however, any other wide area network (WAN) type communication can be utilized in other embodiments, i.e., the systems and processes are not limited to being practiced via the Internet. In one embodiment, information is received at gateway interface 57 and transmitted to node electronics unit 20 via CCPU 24 and digital network 22. In another embodiment, information sent from node electronics unit 20 is received at communication interface 52 and transmitted to Internet 62 via gateway interface 57.

Figure 4:
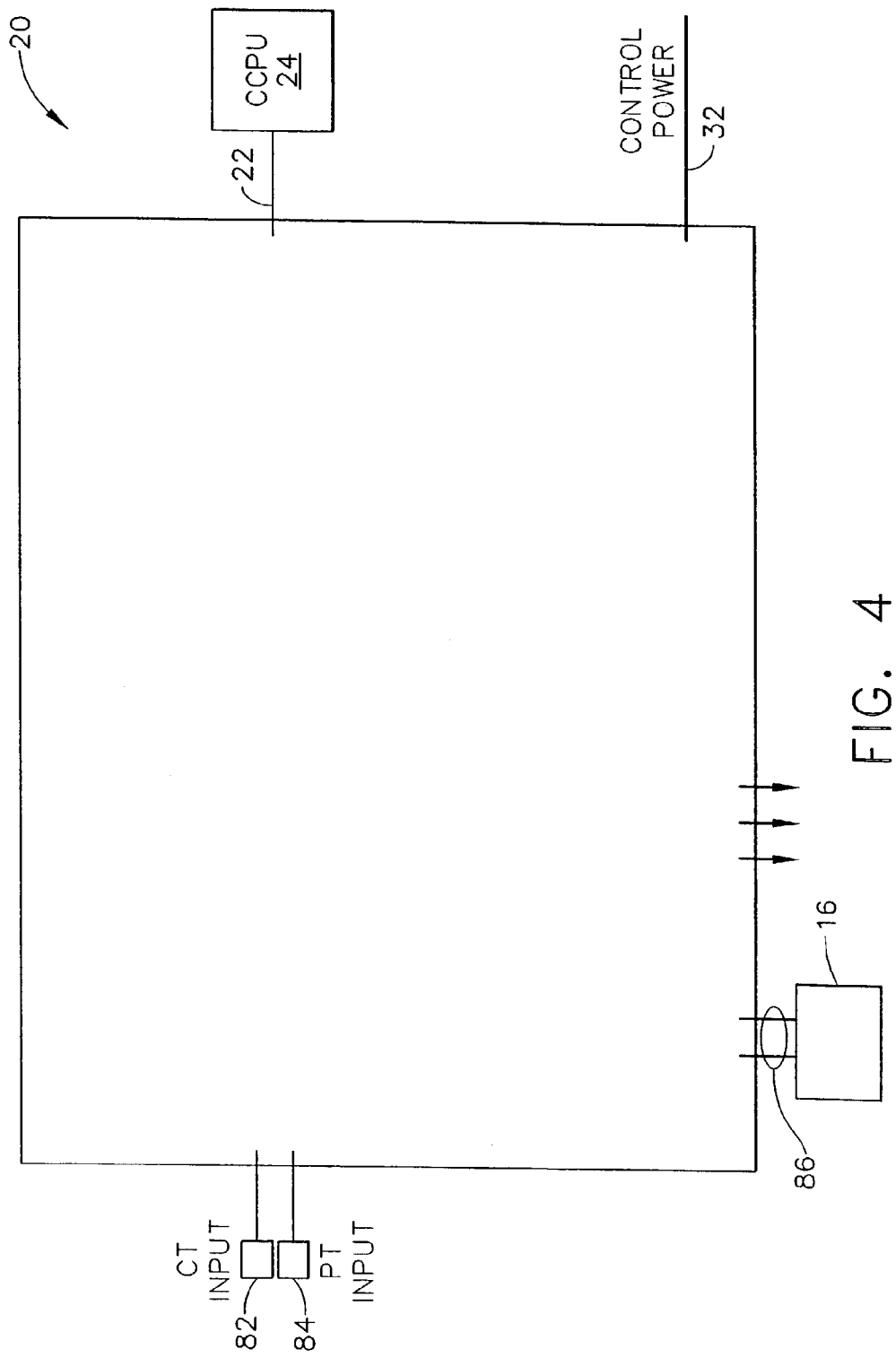
FIG. 4 is an exemplary schematic illustration of a node electronic unit that may used with the power distribution system shown in FIG. 1.

FIG. 4 is an exemplary schematic illustration of single node electronic unit 20. In the exemplary embodiment, node electronic unit 20 is a unitary device mounted remotely from CCPU 24 and circuit breaker 16. In an exemplary embodiment, node electronic unit 20 is separate from, but proximate to circuit breaker 16. In an exemplary embodiment, node electronic unit 20 is a printed circuit board.

In one embodiment, node electronics unit 20 receives signals input from a plurality of devices, such as, but not limited to, a current sensor 82, a voltage sensor 84, and/or circuit breaker 16. Status signals from circuit breaker 16 can include signals related to one or more conditions of the breaker, such as, but not limited to, an auxiliary switch status, and a spring charge switch status. Additionally, node electronics unit 20 sends signals to at least circuit breaker 16 in order to control one or more states of the breaker.

In use, signals are transmitted to CCPU 24 via node electronics unit 20, and digital network 22. Node electronics unit 20 receives the signals and packages a digital message that includes the signals and additional data relating to a health and status of node electronics unit 20. The health and status data may include information based on problems found by internal diagnostic routines and a status of self checking routines that run locally in node electronics unit 20. CCPU 24 processes digital message using one or more protection algorithms, monitoring algorithms, and any combination thereof. In response to the processing of digital message, CCPU 24 sends digital message back to node electronics unit 20 via digital network 22. In the exemplary embodiment, node electronics unit 20 actuates circuit breaker 16 via signal in response to digital message received from CCPU 24. In one embodiment, circuit breaker 16 is actuated in response to commands sent only by CCPU 24, i.e., circuit breaker 16 is not controlled locally by node electronics unit 20, but rather is operated remotely from CCPU 24 based on digital message received from node electronics unit 20 over network 22.

Figure 5:
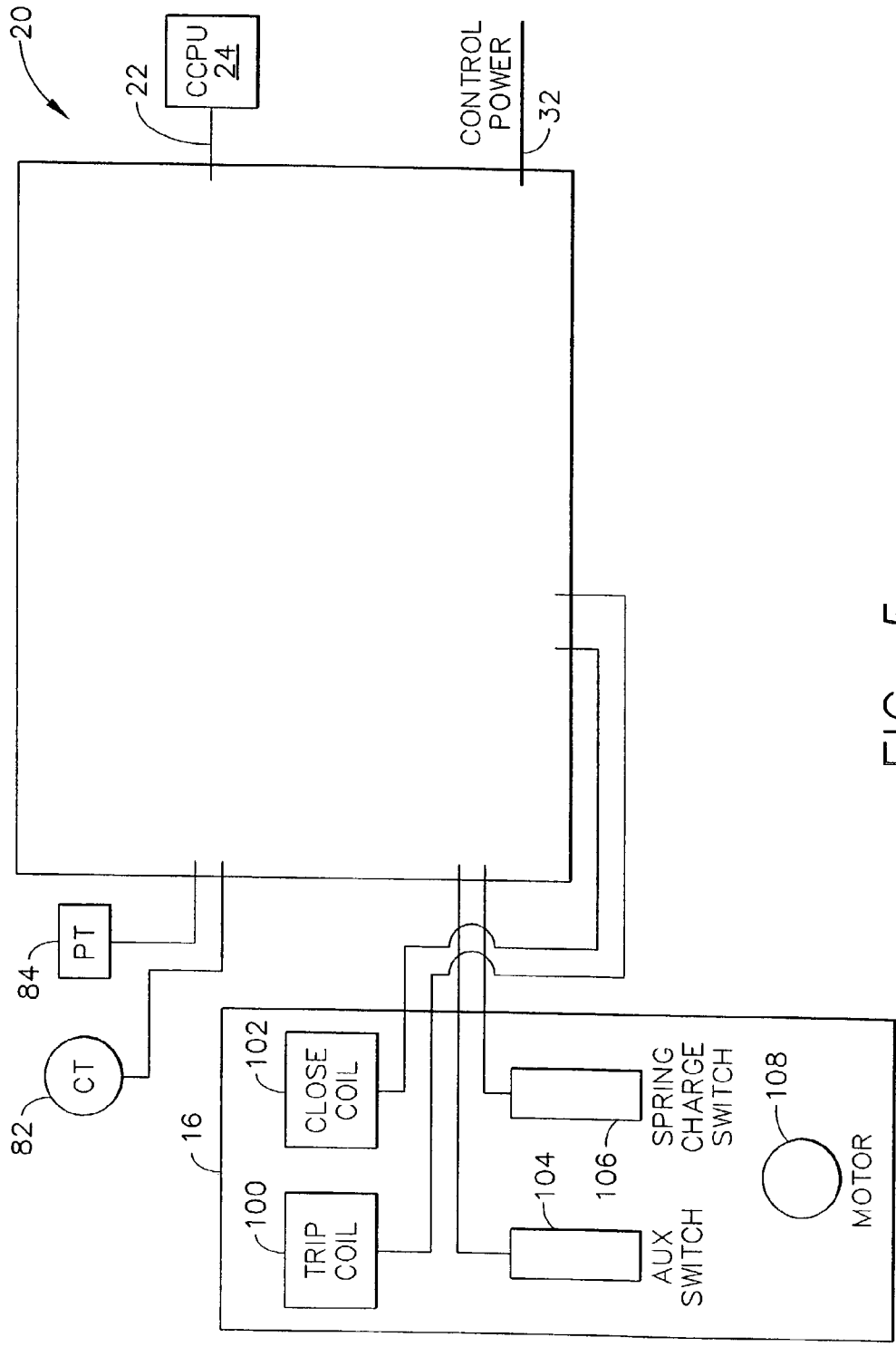
FIG. 5 is an exemplary schematic illustration of a circuit breaker that may used with the power distribution system shown in FIG. 1.

FIG. 5 is an exemplary schematic illustration of circuit breaker 16 that is electrically coupled to node electronics unit 20. In the exemplary embodiment, circuit breaker 16 includes a switch assembly that includes movable and/or stationary contacts, an arc suppression means, and a tripping and operating mechanism. Circuit breaker 16 includes only a trip coil 100, a close coil 102, an auxiliary switch 104, a spring charge switch 106, and a motor 108. Circuit breaker 16 does not include a trip unit. The various components of breaker 16 (e.g., trip coil 100, close coil 102, auxiliary switch 104, spring charge switch 106, motor 108) can be powered by node electronics unit 20. Alternately, breaker 16 can be powered by secondary current available from current sensor 82 and/or voltage sensor 84.

Circuit breaker 16 is in electrical communication with node electronics unit 20 through a wiring harness, which may include copper wiring, communications conduits, and any combination thereof. Current sensor 82, and voltage sensor 84 are in electrical communication with node electronics unit 20 through a cable that may include copper wiring, communications conduits, and any combination thereof. In an exemplary embodiment, circuit breaker 16 is a unitary device mounted proximate to node electronics unit 20, current sensor 82, and voltage sensor 84.

In use, actuation signals from node electronics unit 20 are transmitted to circuit breaker 16 to actuate a plurality of functions in circuit breaker 16, such as, but not limited to, operating a trip coil 100, operating a close coil 102, and affecting a circuit breaker lockout feature. An auxiliary switch 104 and operating spring charge switch 106 provide a status indication of circuit breaker parameters to node electronics unit 20. Motor 108 is configured to recharge an operating spring, configured as a close spring (not shown) after circuit breaker 16 closes. It should be appreciated that the motor 108 can include, for example, a spring charge switch, a solenoid or any other electromechanical device capable of recharging a trip spring. To close circuit breaker 16, a close coil 102 is energized by a close signal from actuation power module (not shown). Close coil 102 actuates a closing mechanism (not shown) that couples at least one movable electrical contact (not shown) to a corresponding fixed electrical contact (not shown). The closing mechanism of circuit breaker 16 latches in a closed position such that when close coil 102 is de-energized, circuit breaker 16 remains closed. When breaker 16 closes, an "a" contact of auxiliary switch 104 also closes and a "b" contact of auxiliary switch 104 opens. The position of the "a" and "b" contacts is sensed by node electronics unit 20. To open circuit breaker 16, node electronics unit 20 energizes trip coil (TC) 100. TC 100 acts directly on circuit breaker 16 to release the latching mechanism that holds circuit breaker 16 closed. When the latching mechanism is released, circuit breaker 16 will open, opening the "a" contact and closing the "b" contact of auxiliary switch 104. Trip coil 100 is then de-energized by node electronics unit 20. After breaker 16 opens, with the close spring recharged by motor 108, circuit breaker 16 is prepared for a next operating cycle. In the exemplary embodiment, each node electronics unit 20 is coupled to circuit breaker 16 in a one-to-one correspondence. For example, each node electronics unit 20 communicates directly with only one circuit breaker 16. In an alternative embodiment, node electronics unit 20 may communicate with a plurality of circuit breakers 16.

Figure 6:
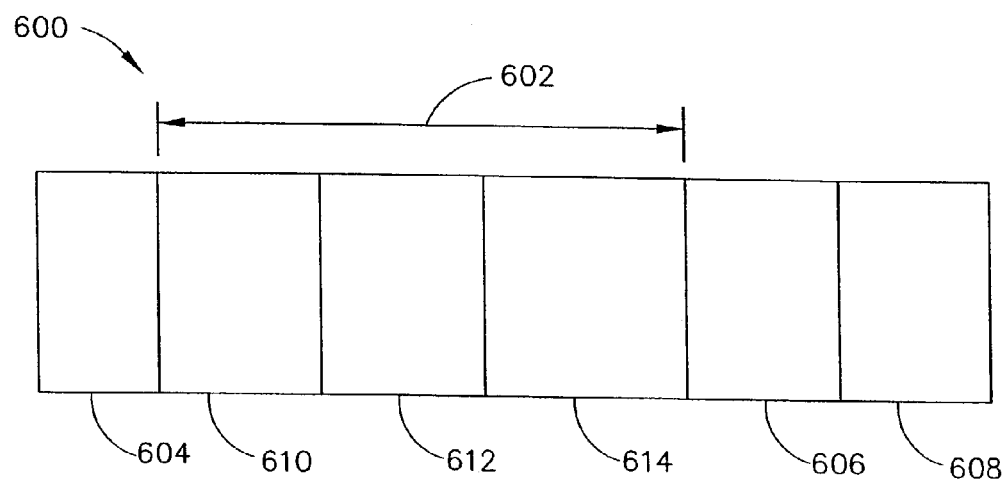
FIG. 6 is a simplified block diagram of an exemplary structure of a digital message packet.

FIG. 6 is a simplified block diagram of an exemplary structure of a digital message packet 600. In the exemplary embodiment, digital message packet 600 includes a communication payload area 602 where message data is stored, a message header 604, a message address area 606, and an end of message area 608. Digital message packets 600 are sent at regular intervals from node electronics unit 20 to each CCPU 24 as a unicast message. A unicast message is a message addressed to a particular node which other nodes will ignore. In contrast to unicast is broadcast. A broadcast message is sent from a single node to a plurality of nodes. Each of the plurality of nodes receives the broadcast message, opens it and acts as each particular node is commanded to by a portion of the broadcast message. Digital message packet 600 are sent at a frequency determined by a resolution requirement of CCPU 24 for the data contained in the message.

Communication payload area 602 includes a plurality of data areas that include algorithmic data, which may be data requested by a sampling node, such as node electronics unit 20. Algorithmic data includes, for example, power distribution system basic protection data, power distribution system metering data, power distribution system waveform capture data and power distribution system harmonic analysis data. Each of such data types contained in these data areas may each be sampled at different data acquisition rates. In the exemplary embodiment, a first data area 610 includes basic protection sample data received from current sensor 82, voltage sensor 84, and status input device 86. Basic protection data may be sampled, for example, at a rate of 32 times per cycle wherein cycle refers to power distribution system 10 line frequency. A second data area 612 may include metering sample data, also received from current sensor 82 and voltage sensor 84. Metering sample data may be sampled, for example, at a rate of 64 times per cycle. A third data area 614 may include waveform capture and harmonic analysis data that is sampled at a third rate, for example 128 times per cycle. Communication payload area 602 may include any number of data areas, only three areas are illustrated by way of example and are not limiting in the number of data areas that may be included in communication payload area 602. Additionally, the above data sample rates are given by way of example and are not limiting in the rate at which sampled data may be stored in communication payload area 602.

Digital message packet 600 is sent at a frequency based on a resolution requirement determined by CCPU 24. A single digital message packet 600 may contain a plurality of samples in each of data areas 610, 612, and 614 depending on the frequency at which digital message packet 600 is sent to CCPU 24. Such a method of sending sample data facilitates effectively using an available bandwidth.

Figure 7:
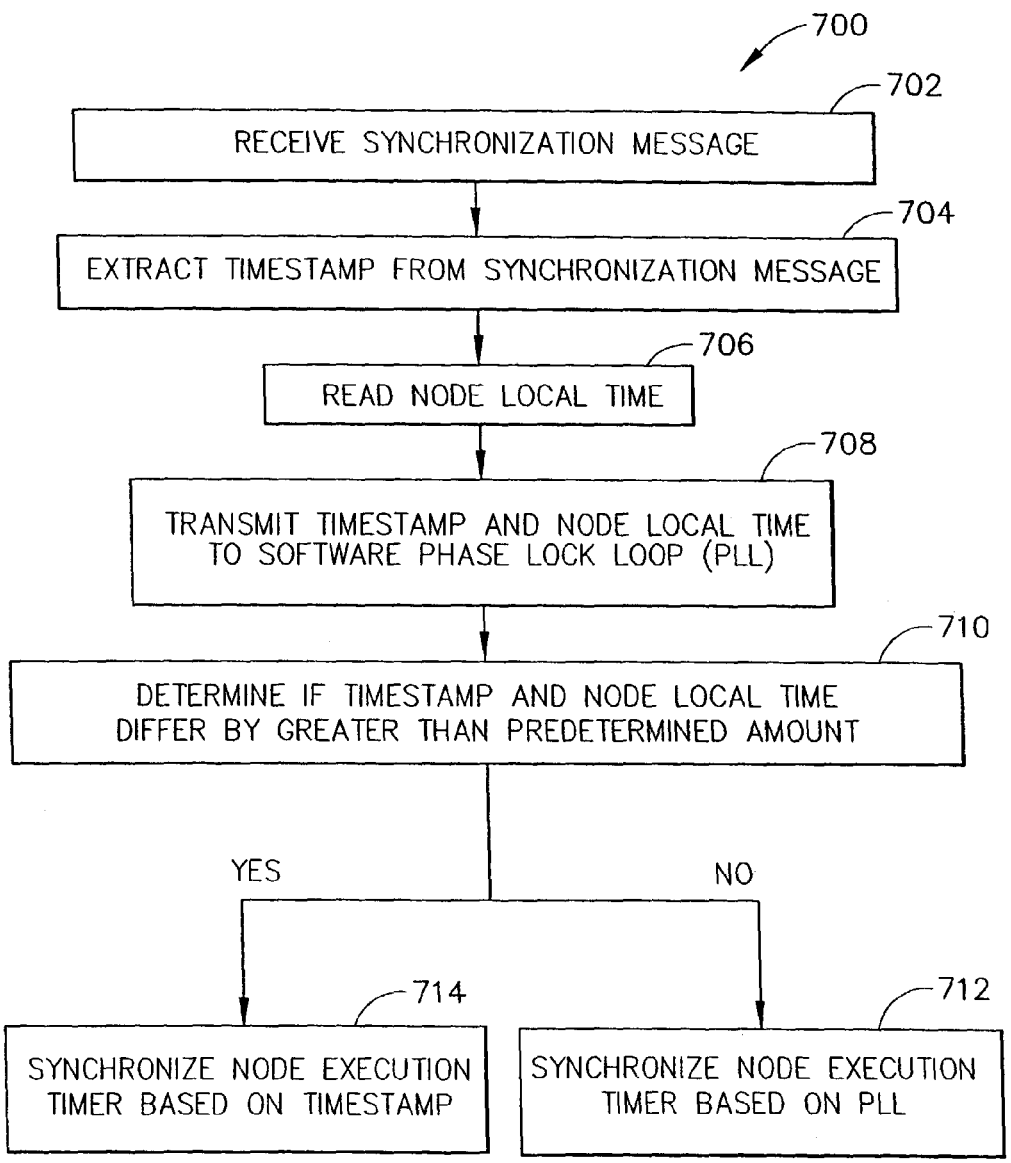
FIG. 7 is an exemplary method 700 for communicating information bundled in digital message packets via a digital network communication system.

FIG. 7 is an exemplary method 700 for communicating information bundled in digital message packets via a digital network communication system. The system includes a sample source, such as a current sensor 82, a voltage sensor 84, and/or a status input device 86. Status input device 86 in turn receives a plurality of status signals from circuit breaker 16, such as, but not limited to, an auxiliary switch status, and a spring charge switch status. Each sample source is sampled by a node electronics unit 20 at a predetermined sample rate based on, for example, communication system data transfer limitations, source transfer limitations, and data message size. Each digital message packet includes a header and a communication payload area. Method 700 includes sampling 702 the source 82, 84, 86 at a first sample rate. The data rate is predetermined based on power distribution system 10 data needs, physical transfer limitations, network traffic limitations, and a type of data being transmitted, and a latency requirement of the system. At any given point in time, any of the above mentioned factors may be changing due to changing conditions within power distribution system 10 and conditions external to power distribution system 10. The system includes a decimation processor that includes a plurality of decimation operations and a local data buffer. Sampled data is decimated to prepare the data for packetizing by selecting 704 at least one decimation of the samples based on at least one of a plurality of algorithmic data rates and a channel bandwidth. A packet rate is determined 706 based on a plurality of algorithmic latency requirements, and each digital message packet containing decimated data is transmitted 708 on the digital network.

The sample rate for sampling the source may be selected to satisfy at least one of a plurality of predetermined algorithmic data rates. For example, the rate may be selected to facilitate achieving a maximum algorithmic data rate and/or to satisfy a predetermined oversampling requirement. Additionally, the sampling rate and/or the oversampling rate, the decimation, the packet rate, and/or a destination address for each message may be modified based on a system resource availability, a network communication noise level, a data signal-to-noise ratio, a change in a number of network nodes, a communication channel utilization, and an authorization of parameters change, and a service request. Each of the above considerations may be changing dynamically during operation of power distribution system 10, such that the sampling rate and/or the oversampling rate, the decimation, the packet rate, and/or a destination address for each message may be determined periodically to satisfy the data transfer needs of power distribution system 10.

Other considerations for determining the sampling rate may include facilitating minimizing a packet transmission overhead, facilitating meeting a predetermined algorithmic latency requirement, facilitating meeting a network data capacity, facilitating minimizing a packet error rate, facilitating minimizing the penalty of a retransmission, facilitating minimizing lost data, facilitating minimizing invalid data, and facilitating maximizing a number of network nodes.

Selection of a decimation of the samples may be based on a functional area for which the sample is being made. For example, a sample rate for power distribution system basic protection data may be less than or slower than a sample rate for power distribution system metering data. Likewise for power distribution system waveform capture data, power distribution system digital oscillography data, and power distribution system harmonic data analysis data. Each functional area data type may have a changing data rate associated with it such that a sample rate for power distribution system metering data may at times be less than the sample rate for power distribution system basic protection data.

Selection of a decimation of the samples may be based on a demand from a remote processor, such as, CCPU 24, a remote monitoring and diagnostics service request, a predetermined periodicity, and a communication network loading. A plurality of decimation operations in the decimation processor are selected based on at least one of the algorithmic data rates and outputs labeled by the decimation operations include base data, incremental data, and a plurality of tags for each of the base data and for each of the incremental data. At least part of the base data and incremental data may be stored in a local data buffer.

The transmitted 708 packets are received through a remote processor such as CCPU 24, each of the incremental data in the packet are prioritized, and using the incremental data, the received data in the packets is progressively reconstructed with increasing data rate and quantization based on the labeling. Base data is obtained by decimation corresponding to a predetermined slowest algorithmic data rate wherein each incremental data output is based on an increasing algorithmic data rate, and/or a quantization requirement. In the exemplary embodiment, the sample rate is selected such that the base data and the incremental data are sent at the same packet rate and the sampling rate is equal to double a predetermined algorithmic data rate. The decimation includes selecting every other sample as the base data, and the alternate every other data as the incremental data and the base data and the incremental data are packetized in the same packet. In the exemplary embodiment, the base data and the incremental data are interleaved such that the incremental data of lowest priority are replaced with either base data, or incremental data of higher priority of previously packetized data. Transmitted packets may be transmitted redundantly to facilitate reducing a data error rate based on network communications conditions.

Service data may be provided to CCPU 24 by replacing at least one of the base data and the incremental data with the data requested, which may include system resources data, communication noise data, signal-to-noise ratio data, data indicating changes in the number of network nodes, communication channel utilization data, authorization of parameters change data, and service requested data. Service requested data includes system status data, local status data, local health data, communication data, signal-to-noise ratio data, event history data, and error history data. Such data is periodically requested by CCPU 24 to update sample rates, packet rates and other system parameters based on current system condition and data transmission needs.

Each packet includes a destination address, and for each destination with active algorithms, packetizing the base data and the incremental data in the same packet includes tagging each of the base data and each of the incremental data. The base data is packaged and the incremental data is prioritized based on latency requirements of the active algorithms at the destination. Packaging the corresponding incremental data is done in decreasing priority order and may be based on of available space in the packet and a predetermined maximum packet length. The maximum packet length may be determined based on a packet rate, a network data capacity, a length that facilitates maximizing the number of nodes in the network communication system. The tags used to tag each of the base data and each of the incremental data may be an implicit tag, a partial tag, a time stamp tag, and/or a counter tag. The destination address in each digital message packet may include a unicast destination address for data specific to each respective destination, a multicast destination address for data common to a set of destinations, and a broadcast destination address for data common to all destinations. Destination addresses may be selected based on facilitating minimizing a packet transmission overhead, facilitating meeting a predetermined algorithmic latency requirement, facilitating meeting a network data capacity, and facilitating maximizing a number of network nodes.

The above-described power distribution system communication system is cost-effective and highly reliable. Each system includes at least one central control processing unit (CCPU) and a plurality of node electronics unit communicatively coupled via a high-speed digital network. There may be additional CCPUs and corresponding network backbones coupled in the power distribution system to facilitate meeting a system reliability goal. Each node electronics unit communicates to every CCPU via a digital message packet that facilitates efficient communication while maintaining a system latency requirement. Accordingly, the power distribution system communication system facilitates protection and optimization of power system operation in a cost-effective and reliable manner.

Exemplary embodiments of power distribution system communication system components are described above in detail. The components are not limited to the specific embodiments described herein, but rather, components of each system may be utilized independently and separately from other components described herein. Each power distribution system communication system component can also be used in combination with other power distribution system components.

While the invention has been described in terms of various specific embodiments, those skilled in the art will recognize that the invention can be practiced with modification within the spirit and scope of the claims.

What is claimed is:

1. A method for communicating information bundled in digital message packets via a digital network communication system wherein the system includes a sample source and each packet includes a header and a communication payload area, the method comprising the steps of:
   sampling the source at a first sample rate;
   selecting at least one decimation of the samples based on at least one of a plurality of algorithmic data rates and a channel bandwidth;
   determining a packet rate based on a plurality of algorithmic latency requirements; and
   transmitting the digital message packet containing decimated data on the digital network,
   wherein algorithmic data includes data requested by a sampling node and wherein sampling the source at a first sample rate comprises sampling algorithmic data that includes at least one of power distribution system basic protection data, power distribution system metering data, power distribution system waveform capture data and power distribution system harmonic analysis data.

2. A method in accordance with claim 1 wherein sampling the source at a first sample rate comprises sampling the source at a sample rate selected to satisfy at least one of a plurality of predetermined algorithmic data rates.

3. A method in accordance with claim 2 wherein sampling the source comprises sampling the source at a rate that facilitates achieving a maximum algorithmic data rate.

4. A method in accordance with claim 2 wherein sampling the source comprises sampling the source at a rate selected to satisfy a predetermined oversampling requirement.

5. A method in accordance with claim 4 further comprising modifying at least one of the sampling rate, an oversampling rate, the at least one decimation, the packet rate, and a destination address based on at least one of a system resource availability, a network communication noise level, a data signal-to-noise ratio, a change in a number of network nodes, a communication channel utilization, and an authorization of parameters change, and a service request.

6. A method for communicating information bundled in digital message packets via a digital network communication system wherein the system includes a sample source and each packet includes a header and a communication payload area, the method comprising the steps of:
   sampling the source at a first sample rate;

selecting at least one decimation of the samples based on at least one of a plurality of algorithmic data rates and a channel bandwidth;

determining a packet rate based on a plurality of algorithmic latency requirements; and transmitting the digital message packet containing decimated data on the digital network, wherein selecting at least one decimation of the samples based on at least one of a plurality of algorithmic data rates and a channel bandwidth comprises selecting at least one decimation of the samples based on at least one of power distribution system basic protection data, power distribution system metering data, power distribution system waveform capture, power distribution system digital oscillography, and power distribution system harmonic data analysis.

7. A method in accordance with claim 6 wherein sampling the source at a first sample rate comprises sampling the source based on at least one of facilitating minimizing a packet transmission overhead, facilitating meeting a predetermined algorithmic latency requirement, facilitating meeting a network data capacity, facilitating minimizing a packet error rate, facilitating minimizing the penalty of a retransmission, facilitating minimizing lost data, facilitating minimizing invalid data, and facilitating maximizing a number of network nodes.

8. A method in accordance with claim 6 wherein selecting at least one decimation of the samples based on at least one of a plurality of algorithmic data rates and a channel bandwidth comprises selecting at least one decimation of the samples based on at least one of a demand from a remote processor, a remote monitoring and diagnostics service request, a predetermined periodicity, and a communication network loading.

9. A method for communicating information bundled in digital message packets via a digital network communication system wherein the system includes a sample source and each packet includes a header and a communication payload area, the method comprising the steps of:

sampling the source at a first sample rate;

selecting at least one decimation of the samples based on at least one of a plurality of algorithmic data rates and a channel bandwidth;

determining a packet rate based on a plurality of algorithmic latency requirements; and transmitting the digital message packet containing decimated data on the digital network, wherein the system includes a decimation processor that includes a plurality of decimation operations, a plurality of outputs labeled by the decimation operations and a local data buffer and wherein selecting at least one decimation of the samples based on at least one of a plurality of algorithmic data rates and a channel bandwidth comprises selecting the decimation operations in the decimation processor based on at least one of the algorithmic data rates.

10. A method in accordance with claim 9 wherein the plurality of outputs labeled by the decimation operations include a plurality of base data, a plurality of incremental data, and a plurality of tags for each of the base data and for each of the incremental data and wherein said method further comprises:

receiving the transmitted packets through a remote processor;

prioritizing each of the plurality of incremental data; and progressively reconstructing the data received in the packets with increasing data rate and quantization based on the labeling using the plurality of incremental data.

11. A method in accordance with claim 10 further comprising obtaining the base data by decimation corresponding to a predetermined slowest algorithmic data rate wherein each incremental data output is based on at least one of each increasing algorithmic data rate, and a quantization requirement.

12. A method in accordance with claim 11 further comprising:

selecting a sample rate wherein the base data and the incremental data are sent at the same packet rate and wherein the sampling rate is equal to double a predetermined algorithmic data rate;

selecting a decimation wherein the decimation includes selecting every other sample as the base data, and the alternate every other data as the incremental data; and packetizing the base data and the incremental data in the same packet.

13. A method in accordance with claim 12 wherein packetizing the base data and the incremental data in the same packet further comprises interleaving the base data and incremental data such that the incremental data of lowest priority are replaced with at least one of base data, and incremental data of higher priority of previously packetized data.

14. A method in accordance with claim 12 further comprising transmitting redundant data packets that include the packetized data.

15. A method in accordance with claim 12 further comprising providing service data by replacing at least one of the base data and the incremental data with at least one of system resources data, communication noise data, signal-to-noise ratio data, data indicating changes in the number of network nodes, communication channel utilization data, authorization of parameters change data, and service requested data.

16. A method in accordance with claim 15 wherein providing service data comprises replacing at least one of the base data and the incremental data with at least one of system status data, local status data, health data, communication data, signal-to-noise ratio data, event history data, and error history data.

17. A method in accordance with claim 12 wherein each packet includes a destination address, and for each destination with active algorithms, said packetizing the base data and the incremental data in the same packet comprises:

tagging each of the base data and each of the incremental data;

packaging the base data; and prioritizing the incremental data based on the latency requirements of the active algorithms at the destination.

18. A method in accordance with claim 17 wherein tagging each of the base data and each of the incremental data comprises tagging each of the base data and each of the incremental data using at least one of an implicit tag, a partial tag, a time stamp tag, and a counter tag.

19. A method in accordance with claim 17 wherein the destination address in each digital message packet includes at least one of a unicast destination addresses for data specific to each respective destination, a multicast destination address for data common to a set of destinations, and a broadcast destination address for data common to all destinations and wherein the method further comprises packaging the corresponding incremental data in decreasing priority order, and based on at least one of available space in the packet and a predetermined maximum packet length.

20. A method in accordance with claim 17 wherein the maximum packet length is determined based on at least one of a packet rate, a network data capacity, a length that facilitates maximizing the number of nodes in the network communication system, and wherein the method further comprises transmitting the digital message packet over the network.

21. A method in accordance with claim 10 further comprising selecting destination addresses based on at least one of facilitating minimizing a packet transmission overhead, facilitating meeting a predetermined algorithmic latency requirement, facilitating meeting a network data capacity, and facilitating maximizing a number of network nodes.

22. A method in accordance with claim 10 further comprising storing at least a portion of the base data and a portion of the incremental data in the local data buffer.

* * * * *